(12) United States Patent
Suzuki et al.

(10) Patent No.: US 9,581,764 B2
(45) Date of Patent: *Feb. 28, 2017

(54) OPTICAL COUPLING MEMBER AND OPTICAL CONNECTOR USING THE SAME

(71) Applicant: MITSUBISHI PENCIL COMPANY, LIMITED, Tokyo (JP)

(72) Inventors: Hitoshi Suzuki, Yokohama (JP);
Hajime Sumitomo, Yokohama (JP);
Akihito Mitsui, Yokohama (JP);
Naohiko Moriya, Yokohama (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/428,187

(22) PCT Filed: Apr. 30, 2013

(86) PCT No.: PCT/JP2013/062585
§ 371 (c)(1),
(2) Date: Mar. 13, 2015

(87) PCT Pub. No.: WO2014/050194
PCT Pub. Date: Apr. 3, 2014

(65) Prior Publication Data
US 2015/0241635 A1 Aug. 27, 2015

(30) Foreign Application Priority Data
Sep. 25, 2012 (JP) .................................. 2012-210995

(51) Int. Cl.
*G02B 6/32* (2006.01)
*G02B 6/38* (2006.01)

(52) U.S. Cl.
CPC ............. *G02B 6/32* (2013.01); *G02B 6/3869* (2013.01); *G02B 6/3878* (2013.01); *G02B 6/3821* (2013.01)

(58) Field of Classification Search
CPC ...... G02B 6/32; G02B 6/4206; G02B 6/4214; G02B 6/4204; G02B 6/4249
(Continued)

(56) References Cited

U.S. PATENT DOCUMENTS 4,632,505 A   12/1986   Allsworth
5,325,454 A    6/1994   Rittle et al.
(Continued)

FOREIGN PATENT DOCUMENTS

JP    54-41249       3/1979
JP    60-97310 A     5/1985
(Continued)

OTHER PUBLICATIONS

International Search Report dated Jun. 11, 2013 issued in corresponding application No. PCT/JP2013/062585.
(Continued)

*Primary Examiner* — Jennifer Doan
(74) *Attorney, Agent, or Firm* — Westerman, Hattori, Daniels & Adrian, LLP

(57) ABSTRACT

The present invention provides an optical coupling member and an optical connector using the optical coupling member, capable of improving the efficiency of an assembly work of the optical connector and positioning optical fibers in the optical connector with high accuracy. The optical coupling member (10) has: holding members (11) for being able to hold optical fibers (21) that are inserted from insertion holes (11a) formed at end parts; lenses housed in housing parts formed at opposite end parts of the holding members (11); and a joining member (13) for connecting the holding
(Continued)

members (11) as aligned in parallel to each other, the joining member being formed of an elastic material.

9 Claims, 15 Drawing Sheets

(58) Field of Classification Search
USPC .......................................... 385/15, 31, 33, 39
See application file for complete search history.

(56) References Cited

U.S. PATENT DOCUMENTS

| | | | |
|---|---|---|---|
| 8,687,929 B2 | 4/2014 | Moriya et al. | |
| 9,195,016 B2 * | 11/2015 | Suzuki ................. | G02B 6/4204 |
| 2012/0099823 A1 * | 4/2012 | Wu ...................... | G02B 6/3817 |
| | | | 385/88 |
| 2012/0106894 A1 * | 5/2012 | Lin ...................... | G02B 6/3821 |
| | | | 385/54 |

FOREIGN PATENT DOCUMENTS

| | | |
|---|---|---|
| JP | 62-104203 U | 7/1987 |
| JP | 2-181710 A | 7/1990 |
| JP | 6-201951 A | 7/1994 |
| JP | 2002-72016 A | 3/2002 |
| JP | 2011-227201 A | 11/2011 |
| WO | 2012/147486 A1 | 11/2012 |

OTHER PUBLICATIONS

Office Action dated Oct. 26, 2016, issued in counterpart Taiwanese Patent Application No. 102117792. (4 pages).

* cited by examiner

FIG.2B SECTION A-A

FIG.2C SECTION B-B

FIG.2D SECTION C-C

SECTION D-D

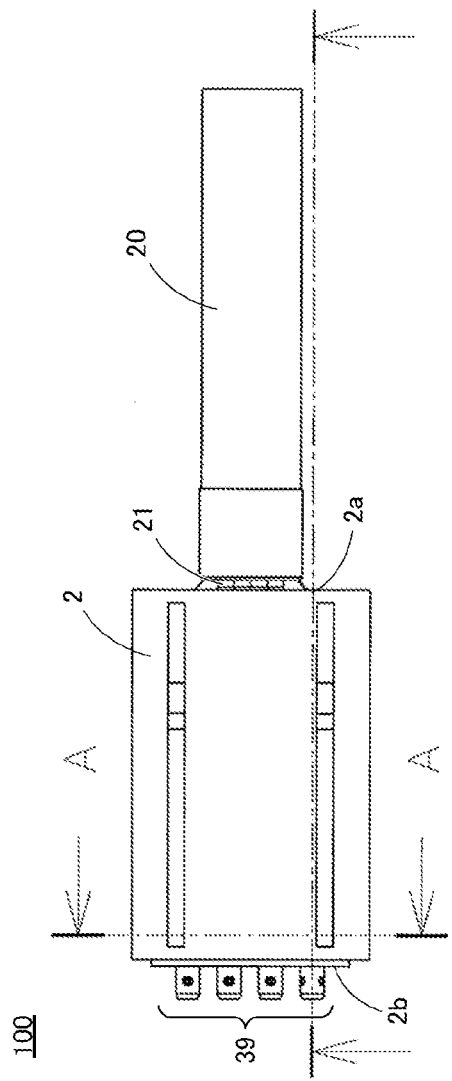
FIG.15A
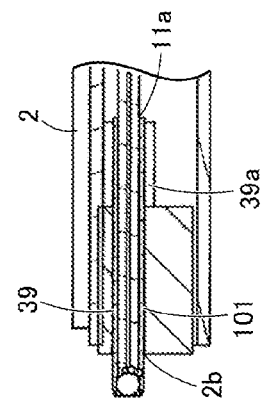
FIG.15B  SECTION A-A
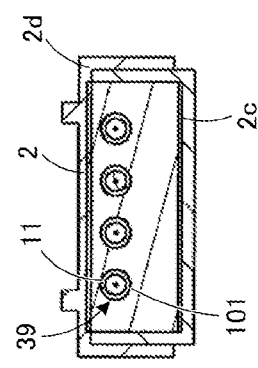
FIG.15C  SECTION C-C

OPTICAL COUPLING MEMBER AND OPTICAL CONNECTOR USING THE SAME

TECHNICAL FIELD

The present invention relates to an optical coupling member for coupling a plurality of optical fibers to an optical connector and also to the optical connector using the optical coupling member.

BACKGROUND ART

In an optical fiber communication system, an optical connector with a plurality of optical fibers aligned at predetermined intervals is used to connect to another optical device or optical connector. Alignment of the optical fibers is generally performed by shaft alignment using positioning grooves such as V-shaped grooves provided at predetermined intervals.

CITATION LIST

Patent Literature

Patent Literature 1: Japanese Patent Application Publication No. 2002-72016

SUMMARY OF THE INVENTION

Technical Problem

However, in the above-described method for alignment of the optical fibers, placement of the optical fibers in the positioning grooves takes much time, which causes a problem of inefficiency of the assembly work of the optical connector.

The present invention was made in view of the foregoing and aims to provide an optical coupling member and an optical connector using the same, capable of positioning optical fibers in the optical connector with high accuracy and improving the efficiency of the assembly work of the optical connector.

Solution to Problem

The present invention provides an optical coupling member characterized by comprising: holding members for being able to hold optical fibers that are inserted from insertion holes formed at end parts of the holding members; lenses housed in housing parts formed at opposite end parts of the holding members; and a joining member for connecting the holding members as aligned, the joining member being formed of an elastic material.

According to the above-described optical coupling member, as the plural holding members capable of holding the optical fibers are connected in parallel to each other by the joining member, it is possible to position the optical fibers with high accuracy without the need to align the optical fibers one by one in positioning grooves in an optical connector. Therefore, it is possible to position the optical fibers highly accurately thereby to assemble the optical connector and also possible to improve the efficiency of the assembly work of the optical connector.

In the above-described optical coupling member, the joining member may cover the holding members around evenly. In this case, as a part of the joining member holds circumferences of the holding members evenly, it is possible to hold the holding members stably.

Besides, in the above-described optical coupling member, the joining member may cover a part of each of the holding members in a radial direction. In this case, as a radial part of each holding member is not covered by the joining member and exposed, it is possible to arrange holding members as a whole on positioning grooves in the optical connector. Therefore, the structure of the optical connector is simplified, thereby making it possible to reduce the manufacturing cost.

Further, in the above-described optical coupling member, a groove part may be formed in the joining member, between every adjacent two of the holding members.

Furthermore, in the above-described optical coupling member, a through hole may be formed in the joining member, between every adjacent two of the holding members.

Furthermore, in the above-described optical coupling member, the through hole may comprise a plurality of through holes arranged in parallel to the holding members.

In these case, as the groove part or through holes are formed thereby to improve the flexibility of the joining member between the holding members, it is possible to improve the flexibility of the optical coupling member as a whole and improve the efficiency of the assembly work of the optical connector.

Furthermore, in the above-described optical coupling member, the joining member may have an opening which makes parts of the holding members exposed when seen from the above.

In this case, as the flexibility of the joining member is improved at the position where the opening is formed, it is possible to improve the flexibility of the optical coupling member as a whole and improve the efficiency of the assembly work of the optical connector.

Further, in the above-described optical coupling member, the optical fibers and the lenses may be each positioned by being in contact with a circumferential wall surface formed by a recess that is provided in a part of an outer circumferential surface of each of the holding members. In this case, as the end surfaces of the optical fibers and the lenses are positioned in contact with the circumferential wall surfaces, it is possible to assure high positioning accuracy of the optical fibers and the lenses.

The present invention also provides an optical connector characterized by connecting the optical coupling member according to any of the above-described aspects. In this case, as the plural holding members capable of holding the optical fibers are connected in parallel to each other by the joining member, it is possible to position the optical fibers with high accuracy without the need to align the optical fibers one by one in positioning grooves in an optical connector. Therefore, it is possible to position the optical fibers highly accurately thereby to assemble the optical connector and also possible to improve the efficiency of the assembly work of the optical connector.

Technical Advantage of the Invention

According to the present invention, it is possible to improve the efficiency of the assembly work of the optical connector and also possible to make the optical connector assembled by positioning the optical fibers in the optical connector with high accuracy.

BRIEF DESCRIPTION OF THE DRAWINGS

FIGS. 2A-D are diagrams each for explaining an example of an optical connector to which an optical coupling member according to an embodiment of the present invention is connected;

FIGS. 15A-C are diagrams each for explaining an example of an optical connector to which an optical coupling member according to the eleventh embodiment is connected.

DESCRIPTION OF EMBODIMENTS

With reference to the attached drawings, embodiments of the present invention will be described in detail below.

Figure 1A:
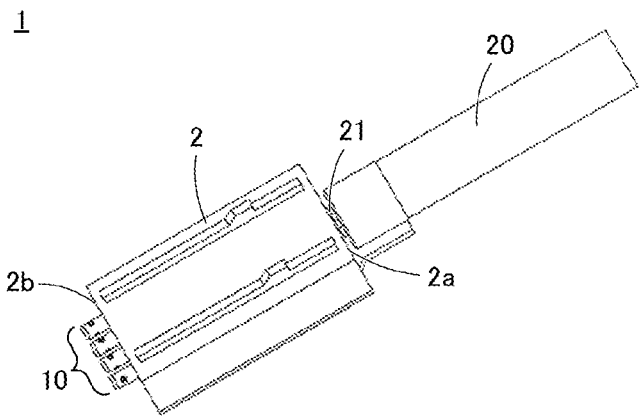
FIGS. 1A-C are diagrams each for explaining an example of an optical connector to which an optical coupling member according to an embodiment of the present invention is connected.
Figure 1B:
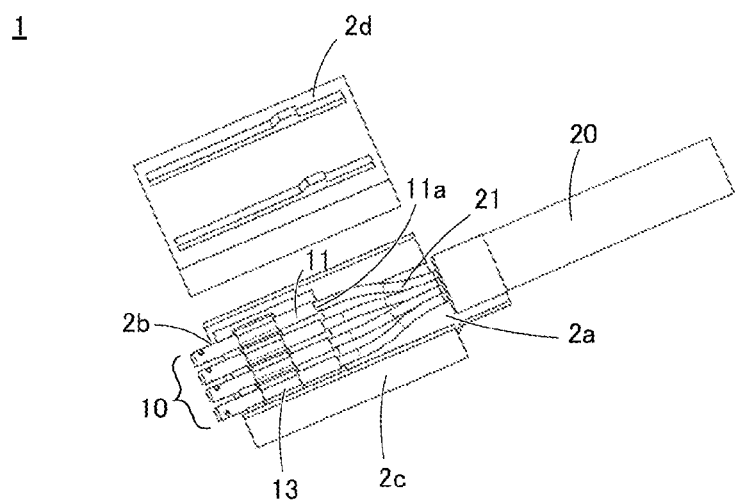
Figure 1C:
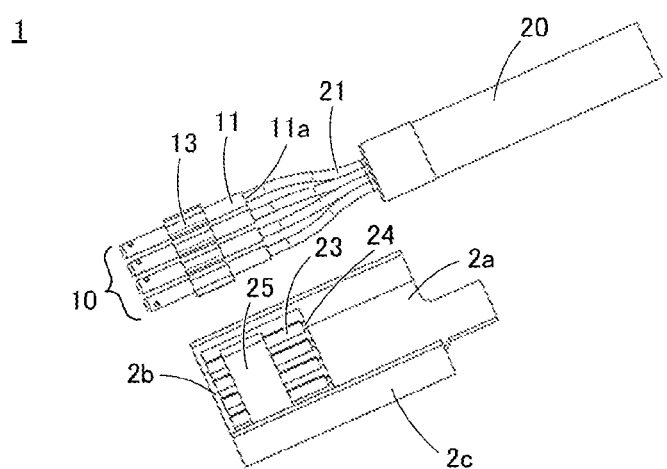

First description is made, with reference to FIGS. 1 and 2, about an optical connector to which an optical coupling member according to an embodiment of the present invention is connected. FIGS. 1 and 2 are diagrams each for explaining an example of an optical connector to which the optical coupling member according to the embodiment of the present invention is connected. FIG. 1A is a perspective view illustrating an example of the optical connector to which the optical coupling member according to the embodiment of the present invention is connected, FIG. 1B is a perspective view illustrating the optical connector illustrated in FIG. 1A from which a cover member of a housing is removed, and FIG. 1C is a perspective view illustrating the optical connector illustrated in FIG. 1B from which the optical coupling member is removed. FIG. 2A is an top view illustrating an example of the optical connector to which the optical coupling member according to the embodiment of the present invention is connected, FIG. 2B is a cross sectional view seen along the arrow A-A in FIG. 2A, FIG. 2C is a cross sectional view seen along the arrow B-B in FIG. 2A and FIG. 2D is a cross sectional view seen along the arrow C-C in FIG. 2A.

As illustrated in FIG. 1A, the optical connector 1 has an approximately rectangular solid shaped housing 2. At an end part 2a of the housing 2, a plurality of optical fibers 21 jutting from a multi-core optical fiber cable 20 are inserted, and at the opposite end part 2b of the housing 2, an optical coupling member 10 mounted on the optical fibers 21 is partially exposed. The optical fibers 21 used here may be, without any limitations, publicly known glass optical fibers, plastic optical fibers or H-PCF (Hard Plastic Clad Fiber).

As illustrated in FIG. 1B, in the optical connector 1, on a base 2c of the housing 2 from which the cover member 2d is removed, the optical fibers 21 and the optical coupling member 10 are arranged. In the embodiment of the present invention, four optical fibers 21 are jutting from the multi-core optical fiber cable 20. The optical coupling member 10 is configured to include holders 11 and a joining member 13 for joining the holders 11 in parallel to each other. The number of holders 11 is the same as the number of the optical fibers 21 (four in the embodiment of the present invention). The optical coupling member 10 is mounted on the optical fibers 21 by inserting the optical fibers 21 into the holders 11 via insertion holes 11a provided at end parts of the holders 11.

As illustrated in FIG. 1C, in the optical connector 1, there are provided in the base 2c of the housing 2 near the opposite end part 2b, positioning grooves 23 and 24 and a recess part 25 for positioning and fixing the optical coupling member 10. In the positioning grooves 23, the holders 11 in the optical coupling member 10 are arranged. In the positioning grooves 24, the optical fibers 21 jutting from the insertion holes 11a of the holders 11 are arranged therein. In the recess part 25, the joining member 13 in the optical coupling member 10 is arranged therein.

In the present embodiment, the number of the positioning grooves 23 is four as is the same with the holders 11 and the optical fibers 21, and the positioning grooves 23 are arranged in parallel and equally spaced from each other. The width of each of the positioning grooves 23 is formed to be approximately equal to the diameter of each holder 11. The positioning grooves 24 are provided as connected to the respective positioning grooves 23 and its width is approximately equal to the diameter of each optical fiber 21. The recess part 25 is configured to have such a size that the joining member 13 can be housed therein and the recess part 25 is provided at an intermediate part of the positioning grooves 23 so as to divide the positioning grooves 23.

Figure 2A:
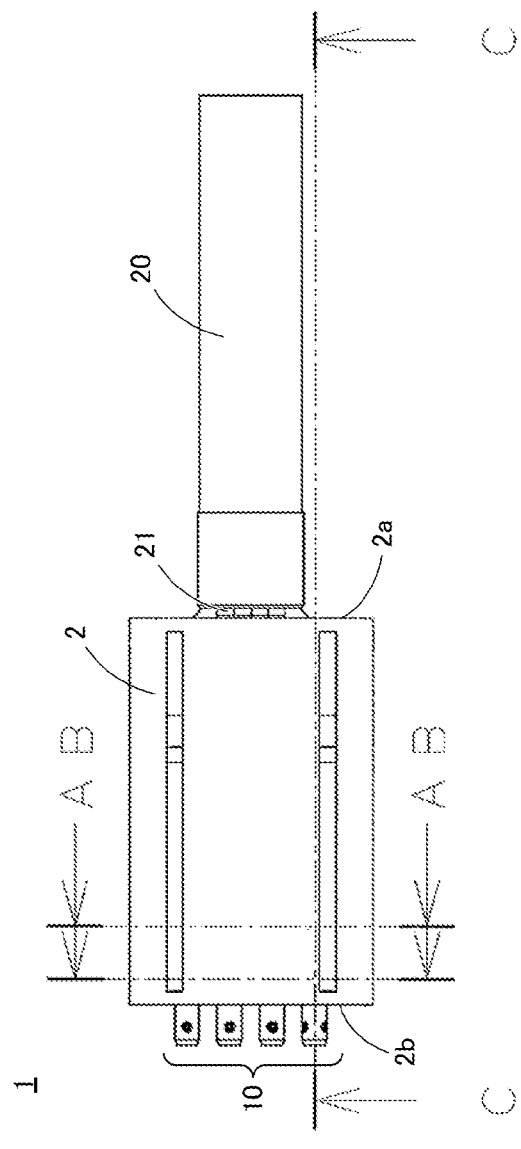
Figure 2A:
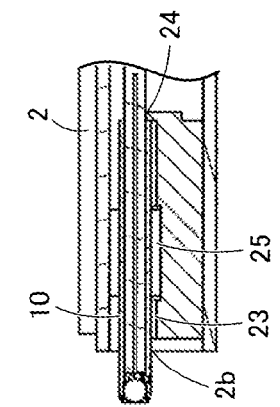
Figure 2A:
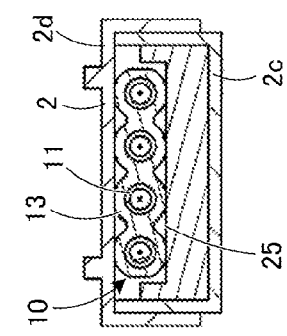
Figure 2A:
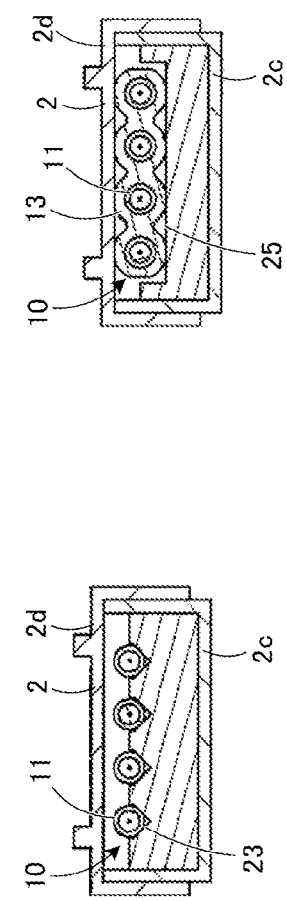

As illustrated in FIG. 2A, in the optical connector 1, parts of the holders 11 (a part of the optical coupling member 10) jutting from the opposite end part 2b are aligned as equally spaced from each other and the respective jutting parts are equal in length from each other.

As illustrated in FIG. 2B, the positioning grooves 23 in the optical connector 1 each have a V shaped cross section. In the positioning grooves 23, the holders 11 in the optical coupling member 10 are placed therein and aligned. When the holders 11 are arranged on the positioning grooves 23, their lower half parts are housed in the positioning grooves 23 and upper half parts are jutting from the positioning grooves 23.

As illustrated in FIG. 2C, the recess part 25 in the optical connector 1 is formed to have a U shaped cross section and its depth is formed approximately equal to half of the thickness of a part of the optical coupling member 10 where the joining member 13 is provided. When the joining member 13 is arranged in the recess part 25 in the optical connector 1, its lower half part is housed in the recess part 25 and its upper half part juts from the recess part 25.

In the optical connector 1, the cover member 2d of the housing 2 is in contact with an upper end part of the joining member 13. With this structure, the joining member 13 receives a downward force from the cover member 2d so that the optical coupling member 10 as a whole is fixed as pressed toward the base 2c.

As illustrated in FIG. 2D, the optical coupling member 10 is configured such that when the optical coupling member 10 is positioned by the positioning grooves 23 and 24 and the recess part 25, its tip end part juts from the opposite end part 2b of the housing 2.

The following description is made about the structure of the optical coupling member 10 according the embodiment of the present invention connected to this optical connector 1.

(First Embodiment)

Figure 3A:
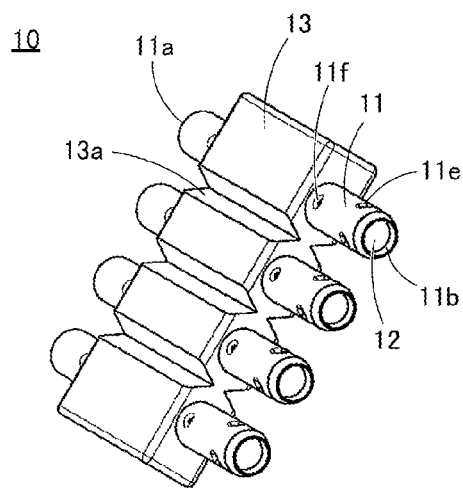
FIGS. 3A-D are diagrams each for explaining an optical coupling member according to a first embodiment.
Figure 3C:
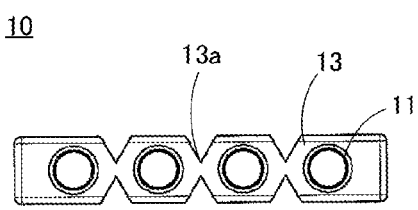
Figure 3B:
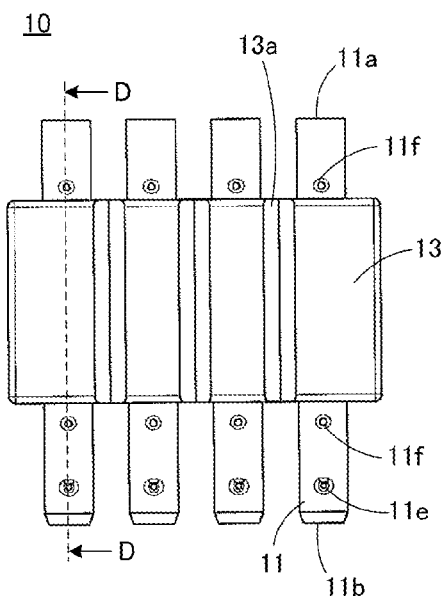
Figure 3D:
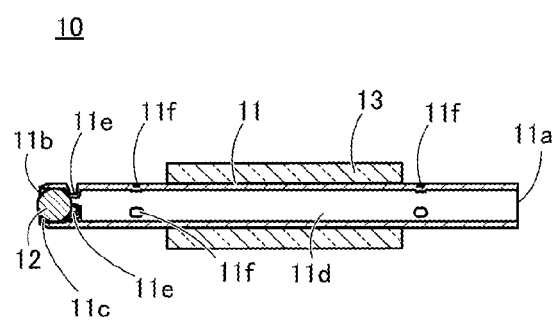

The optical coupling member 10 according to the first embodiment will be described based on FIG. 3. FIG. 3 provides explanatory views each illustrating the optical coupling member according to the first embodiment. FIG. 3A is a perspective view of the optical coupling member 10 according to the first embodiment, FIG. 3B is a top view of the optical coupling member 10, FIG. 3C is a front view of the optical coupling member 10 and FIG. 3D is a cross sectional view seen along the arrow D-D in FIG. 3B.

As illustrated in FIGS. 3A to 3D, the optical coupling member 10 is configured to have the holders 11 as holding members each having an approximately cylindrical shape, lenses 12 held at end parts of the respective holders 11 and the joining member 13 for joining the plural holders 11 in parallel to each other.

The holder 11 is formed, for example, by molding with a metal material, a resin material and a ceramics material. The metal material for forming the holder 11 may be, for example, stainless steel, a copper material or the like. The resin material for forming the holder 11 may be, for example, polypropylene (PP), acrylonitrile-butadiene-styrene copolymer (ABS), polyacetal (POM), polycarbonate (PC), polybutylene terephthalate (PBT), polyethylene terephthalate (PET), polybutylene naphthalate (PEN), polyethersulfone (PES), polyphenylene ether (PPE), Polyamide imide (PAI), Polyether imide (PEI) or the like. The holder 11 is formed by performing various molding works such as injection molding, extrusion molding and press molding on these resin materials.

The ceramics material for forming the holders 11 may be, for example, zirconia, alumina, silicon nitride, silicon carbide or the like. The holder 11 is formed by performing various molding works such as injection molding, extrusion molding and press molding on these ceramics materials. Further, the material for forming the holder 11 may be glass or crystallized glass.

As illustrated in FIG. 3D, at an end part of the holder 11 at the lens 12 side, there is formed an opening 11b. Inside this opening 11b, a housing part 11c is formed for housing the lens 12. This housing part 11c is formed to have a size slightly smaller than the diameter of the lens 12 so that the lens 12 can be pressure-inserted therein.

Inside the holder 11, a through hole 11d is formed to have an approximately same diameter as the outer diameter of the optical fiber 21. This through hole 11d is provided to be connected to the insertion hole 11a and the housing part 11c.

In each holder 11, a plurality of positioning recesses 11e are formed. These positioning recesses 11e are provided on the outer circumference of the holder 11, between the housing part 11c and the through hole 11d, for positioning the lens 12 and the optical fiber 21 (see FIG. 4). These positioning recesses 11e are formed by performing a pressure work on the holder 11 using a machine tool.

Further, in the holder 11, there are provided a plurality of recesses 11f. These recesses 11f are formed, after the optical fiber 21 is inserted into the holder 11, by performing a pressure work on the outer circumferential surface of the holder 11 using a machine tool. These recesses 11f are provided for fixing the optical fiber 21 by sandwiching the optical fiber 21 between the bottom wall surfaces. In FIGS. 3A to 3D, the recesses 11f are already formed. The optical fiber 21 inserted into the holder 11 may be fixed by an adhesive agent.

The lens 12 is a ball lens having a spherical shape formed by molding with a glass material or a plastic material. As illustrated in FIG. 3D, the lens 12 is housed in the housing part 11c of the holder 11. In FIGS. 3A to 3D, the lens 12 is arranged as wholly housed in the holder 11, however, a part of the lens 12 may be exposed from the opening 11d.

The joining member 13 is formed of an elastic material (stretchable material) such as elastomer and is provided to cover the holders 11 around evenly. The joining member 13 has an approximately rectangular solid shape and is arranged at the position to connect the center positions of the holders. The length of a side of the joining member 13 along the longitudinal direction of each holder 11 is approximately half of the length of the holder 11. The thickness of the joining member 13 is formed to be larger than the diameter of the holder 11 (see FIG. 3C). With these configurations, the joining member 13 is able to hold the holders 11 with stable balance reliably.

The joining member 13 is formed to be integral with the holders 11 by insertion molding or by inserting the holders 11 into the joining member 13.

In the joining member 13, there are provided groove parts 13a each having a V-shaped cross section and being formed between every adjacent holders 11, in parallel to the holders 11. The groove parts 13a are configured in pairs such that two groove parts 13 are depressed from the respective opposite surfaces of the joining member 13 toward the center. With these groove parts 13a, it is possible to improve flexibility between the holders 11 in the joining member 13, thereby improving the flexibility of the optical coupling member 10 as a whole and also improving the efficiency of the assembly work of the optical connector 1.

Here, the groove parts 13a have been described as each having a V shaped cross section. However, the shape of each groove part 13a is not limited to this, and may be modified appropriately. For example, the groove part may have an arc shaped cross section or square cross section.

Figure 4:
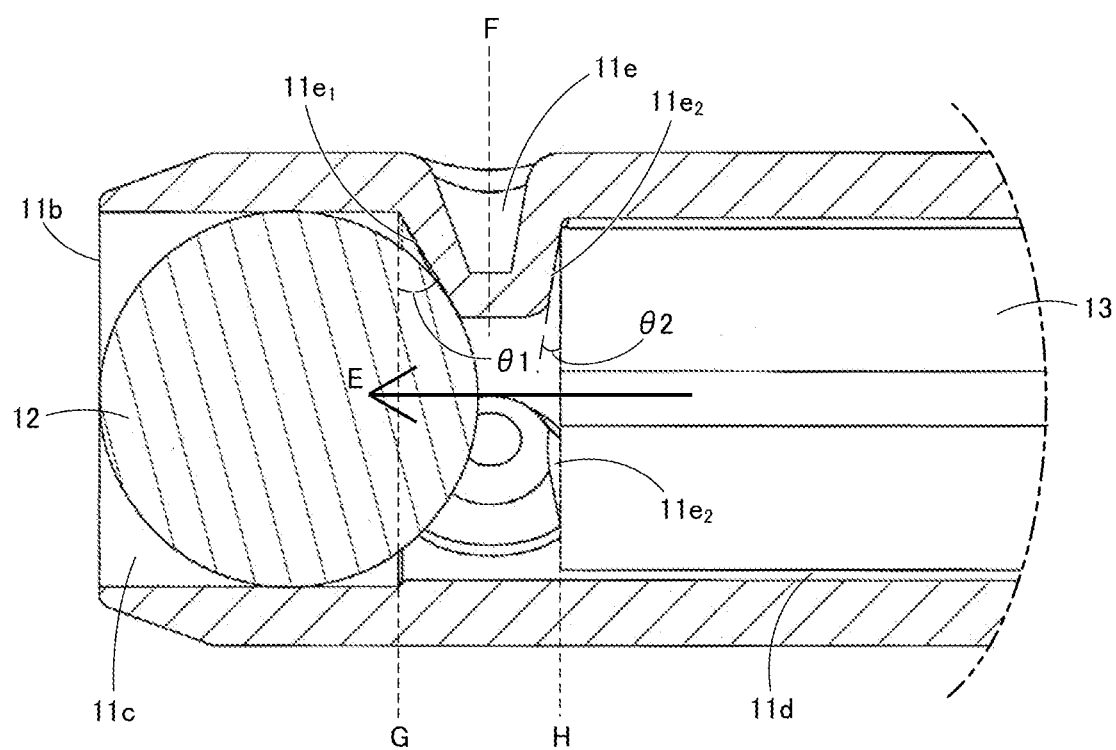
FIG. 4 is an enlarged view of a part around a positioning recess when an optical fiber is inserted into a holder.
Figure 5A:
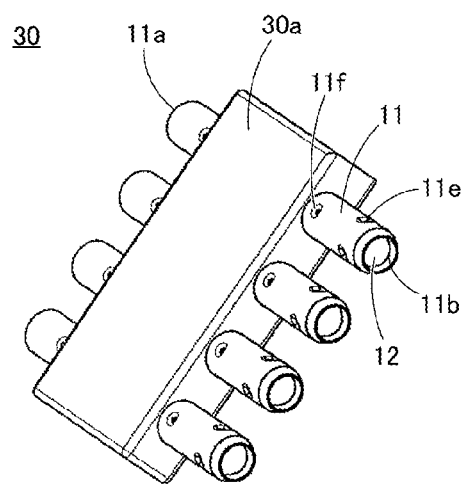
FIGS. 5A-D are diagrams each for explaining an optical coupling member according to a second embodiment.
Figure 5C:
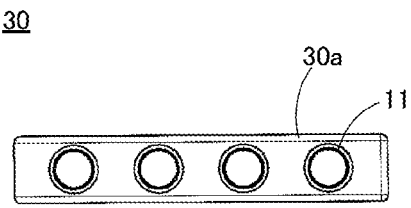
Figure 5B:
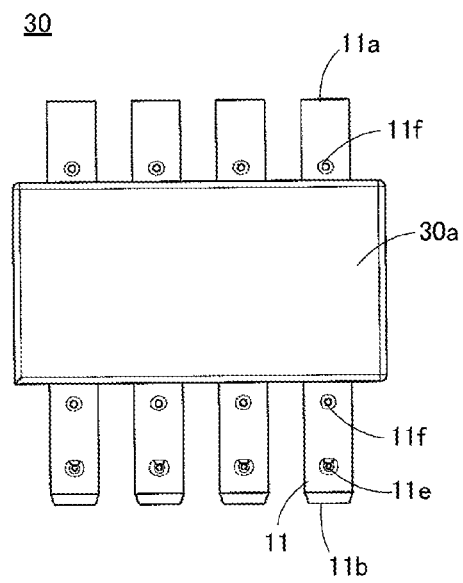
Figure 5D:
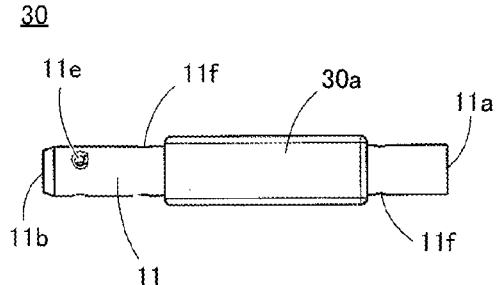
Figure 6A:
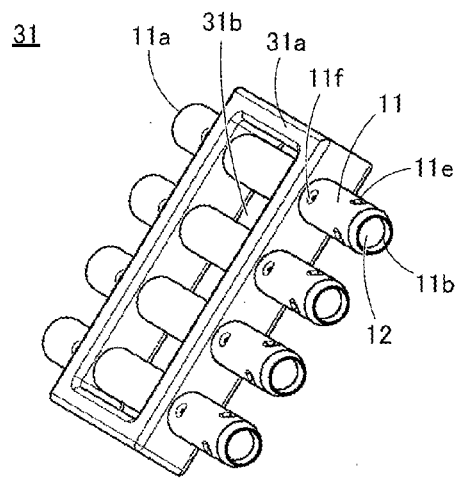
FIGS. 6A-D are diagrams each for explaining an optical coupling member according to a third embodiment.
Figure 6C:
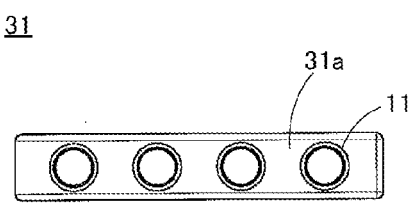
Figure 6B:
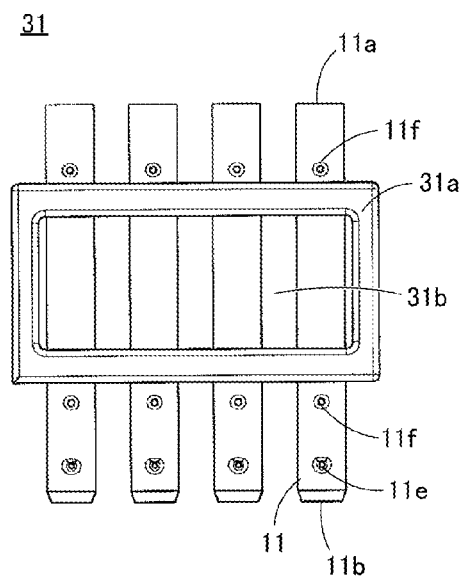
Figure 6D:
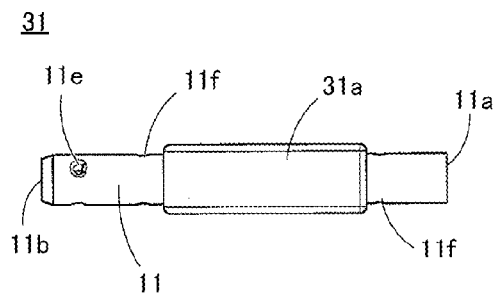
Figure 7A:
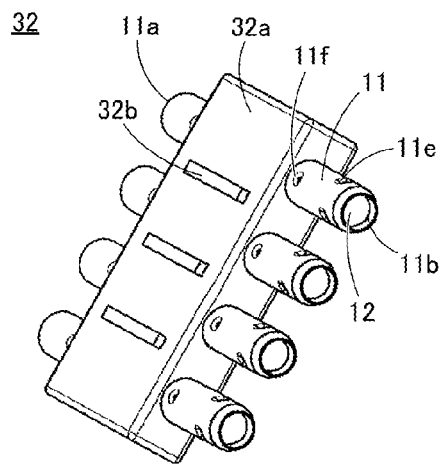
FIGS. 7A-D are diagrams each for explaining an optical coupling member according to a fourth embodiment.
Figure 7C:
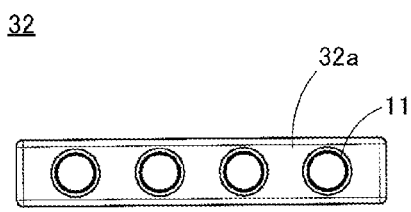
Figure 7B:
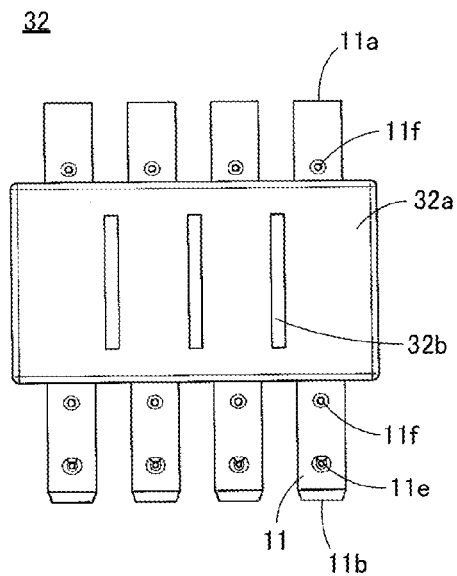
Figure 7D:
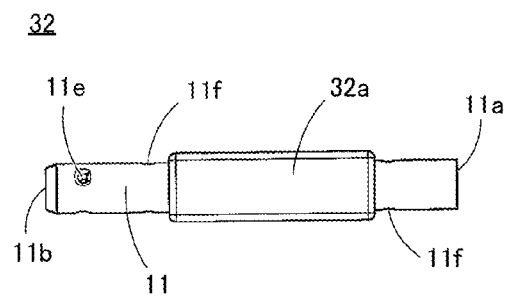
Figure 8A:
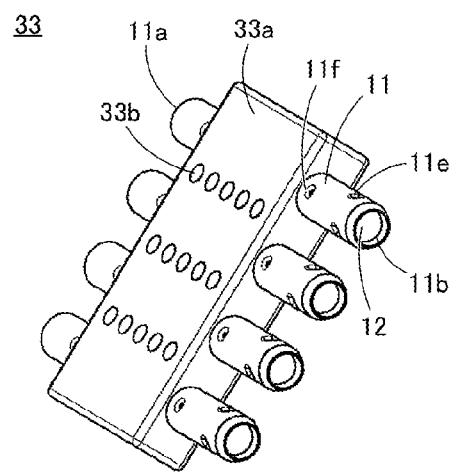
FIGS. 8A-D are diagrams each for explaining an optical coupling member according to a fifth embodiment.
Figure 8C:
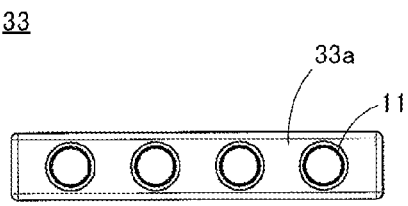
Figure 8B:
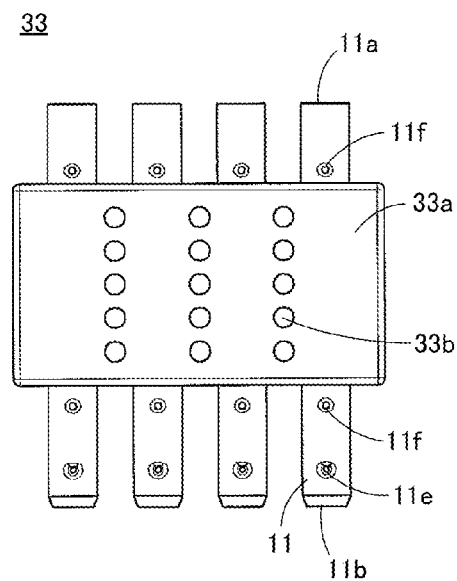
Figure 8D:
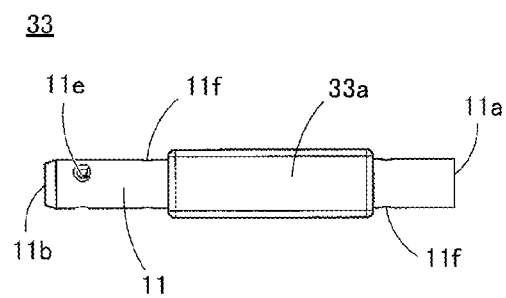

Next description is made about a method for positioning the optical fiber 21 and the lens 12 using the positioning recess 11e, with reference to FIG. 4. FIG. 4 is an enlarged view of a part around the positioning recess 11e when the optical fiber 21 is inserted into the holder 11.

As illustrated in FIG. 4, the positioning recess 11e is configured such that the angle of a part facing the lens 12 and the angle of a part facing the optical fiber 21 become different with respect to the plane orthogonal to the insertion direction of the optical fiber 21 illustrated by the arrow E (for example, the plane F that is arranged in parallel with the end surface of the optical fiber 21 illustrated in FIG. 4 and passes through the center of the positioning recess 11e). This positioning recess 11e is formed by performing a pressure work using machine tools with different-shaped tip ends.

The positioning recesses 11e are provided on the same circumference of the holder 11 as equally spaced from each other (three positioning recesses in this embodiment). In the optical coupling member 10, the plural positioning recesses 11e are formed by performing a pressure work on the outer circumference sides of the holders 11 using the above-mentioned machine tools simultaneously. The lens 12 and the optical fiber 21 are in contact, at plural points, with the plural positioning recesses 11e formed on the same circumference and therefore, it is possible to position the lens 12 and the optical fiber 21 with high accuracy.

In accordance with the shape of each positioning recess 11e, a circumferential wall surface formed by the positioning recess 11e is also configured such that the angle of a part facing the lens 12 and the angle of a part facing the optical fiber 21 become different with respect to the plane orthogonal to the insertion direction of the optical fiber 21 as illustrated by the arrow E (for example, the plane F that is arranged in parallel with the end surface of the optical fiber 21 illustrated in FIG. 4 and passes through the center of the positioning recess 11e). Of this circumferential wall surface, the part facing the lens 12 is called a circumferential wall surface $11e_1$ and the part facing the optical fiber 21 is called a circumferential wall surface $11e_2$.

In the circumferential wall surface $11e_1$ formed at the part facing the lens 12 in the positioning recess 11e, the angle $\theta_1$ of the circumferential wall surface $11e_1$ with respect to the plane orthogonal to the insertion direction of the optical fiber 21 as illustrated by the arrow E (for example, plane G that is arranged in parallel with the end surface of the optical fiber 21 illustrated in FIG. 4 and passes through a base end part of the positioning recess 11e) is 0 to 45 degrees, inclusive. As the circumferential wall surface $11e_i$ formed by the positioning recess 11e is used, it is possible to position the lens 12 while supporting a part of the lens 21 at the optical fiber 21 side, thereby enhancing the positioning accuracy of the lens 12.

On the other hand, in the circumferential wall surface $11e_2$ formed at the part facing the optical fiber 21 in the positioning recess 11e, the angle $\theta_2$ of the circumferential wall surface $11e_2$ with respect to the plane orthogonal to the insertion direction of the optical fiber 21 illustrated by the arrow E (for example, the plane H that is arranged in parallel with the end surface of the optical fiber 21 illustrated in FIG. 4) is 0 to 20 degrees, inclusive. As the circumferential wall surface $11e_2$ formed by the positioning recess 11e is used, for example, when the end surface of the optical fibers 21 is arranged at grade, it is possible to position the optical fibers 21 in contact with the circumferential wall surface $11e_2$, thereby assuring the positioning accuracy of the optical fiber 21.

Here, in the above description, the plural positioning recesses 11e are provided by way of example. However, this is not intended to limit the present invention. A positioning recess 11e may be provided as an annular recess part formed over the whole circumferential surface of the holder 11, between the housing part 11c and the through hole 11d.

Next description is made about the assembly process of the optical connector 1 using the optical coupling member 10 according to the first embodiment. The assembly process of the optical connector 1 includes a step (a) of mounting the optical coupling member 10 on the optical connector 1 and a step (b) of inserting optical fibers 21 into the optical coupling member 10. Each of the steps will be described in detail below.

<Step (a)>

First, the optical coupling member 10 is arranged as being positioned using the positioning grooves 23 and 24 and the recess part 25 of the optical connector 1 (see FIGS. 1B and 1C). The pitch of the positioning grooves 13 and the pitch of the holders 11 connected by the joining member 13 are set to be equal to each other, and by arranging the joining member 13 on the recess 25 and arranging the holders 11 on the positioning grooves 23, it is possible to mount the holders 11 on the optical connector 1, in parallel to each other.

Further, as the joining member 13 is formed of an elastic material such as elastomer and has groove parts 13a, thereby improving the flexibility of the joining member 13. Accordingly, even if the pitch of the positioning grooves 23 and the pitch of the holders 11 connected by the joining member 13 are slightly different, it is possible to arrange the holders 11 on the positioning groove 23 and position them accurately.

<Step (b)>

Next, each optical fiber 21 is inserted via the insertion hole 11a of the holder 11 into the through hole 11d. The optical fiber 21 is guided by the inner wall that defines the through hole 11d and reaches the positioning recess 11e. Once the optical fiber 21 gets in contact with the circumferential wall surface $11e_2$ formed by the positioning recess 11e, the insertion work is finished.

After the optical fiber 21 is positioned by the positioning recess 11e, a plurality of recesses 11f are formed in a part of the holder 11 by performing a pressure work using a machine tool thereby to fix the optical fiber 21.

Once these steps (a) and (b) are finished, the optical connector 1 as illustrated in FIGS. 1 and 2 is obtained. Here, in the assembly process of the optical connector 1, the order of the steps (a) and (b) is not limited to this, but may be reversed like the order of the steps (b) and (a).

As described above, as the plural holders 11 capable of supporting the optical fibers 21 are connected in parallel with each other by the joining member 13 in the optical coupling member 10, it is possible to position the optical fibers 21 with high accuracy without the need to align the optical fibers 21 one by one in the positioning grooves 23 in the optical connector 1. Accordingly, it is possible to improve the efficiency of the assembly work of the optical connector 1 and allow highly accurate positioning of the optical fibers 21 in the optical connector 1.

(Second Embodiment)

The optical coupling member 10 according to the first embodiment has been described such that the groove parts 13a are formed at parts of the joining member 13. An optical coupling member according to the second embodiment is different from the optical coupling member 10 according to the first embodiment in that such groove parts are not formed in the second embodiment. In the following description, the following description is made about the structure of the optical coupling member according to the second embodiment, focusing on the difference from the optical coupling member 10 according to the first embodiment.

FIG. 5 provides diagrams each for explaining an optical coupling member 30 according to the second embodiment. FIG. 5A is a perspective view of the optical coupling member 30 according to the second embodiment, FIG. 5B is a top view of the optical coupling member 30, FIG. 5C is a front view of the optical coupling member 30 and FIG. 5D is a side view of the optical coupling member 30. In the second embodiment, common structural parts with the optical coupling member 10 according to the first embodiment are denoted by like reference numerals and their explanation is omitted here.

A joining member 30a is formed by molding with an elastic material such as elastomer and is provided to cover the holders 11 around evenly. The joining member 30a is formed to have an approximately rectangular solid shape and is arranged at the position to connect the centers of the holders 11. The length of a side of the joining member 30a along the longitudinal direction of each holder 11 is approximately half of the length of the holder 11. The thickness of the joining member 30a is formed to be larger than the diameter of the holders 11 (see FIG. 5C).

Thus, according to the optical coupling member 30 of the second embodiment, the structure of the joining member 30a is able to be simplified and therefore, it is possible to reduce the manufacturing cost of the joining member 30a and finally reduce the manufacturing cost of the optical coupling member 30.

(Third Embodiment)

The optical coupling member 10 according to the first embodiment has been described such that the groove parts 13a are formed at parts of the joining member 13. An optical coupling member according to the third embodiment is different from the optical coupling member 10 according to the first embodiment in that an opening is formed instead of such groove parts. The following description is made about the structure of the optical coupling member according to the third embodiment, focusing on the difference from the optical coupling member 10 according to the first embodiment.

FIG. 6 provides diagrams each for explaining an optical coupling member 31 according to the third embodiment. FIG. 6A is a perspective view of the optical coupling member 31 according to the third embodiment, FIG. 6B is a top view of the optical coupling member 31, FIG. 6C is a front view of the optical coupling member 31, and FIG. 6D is a side view of the optical coupling member 31.

In the third embodiment, common structural parts with the optical coupling member 10 according to the first embodiment are denoted by like reference numerals and their explanation is omitted here.

A joining member 31a is formed by molding with an elastic material such as elastomer and is provided to cover the holders 11 around evenly. In the joining member 31a, an opening 31b is formed which makes parts of the holders 11 seen from the above. The joining member 31a is arranged at the position to connect the centers of the holders 11. The length of a side of the joining member 31a along the longitudinal direction of each holder 11 is approximately half of the length of the holder 11. The thickness of the joining member 31a is formed to be larger than the diameter of the holder 11 (see FIG. 6C).

Thus, according to the optical coupling member 31 of the third embodiment, as the joining member 31a has the opening 31b formed to make parts of the holders 11 exposed, it is possible to improve the flexibility of the joining member 31a at the position where the opening 31b is formed, thereby improving the flexibility of the optical coupling member 31 as a whole and also improving the efficiency of the assembly work.

(Fourth Embodiment)

The optical coupling member 10 according to the first embodiment has been described such as the groove parts 13a are formed at parts of the joining member 13. An optical coupling member according to the fourth embodiment is different from the optical coupling member 10 according to the first embodiment in that through holes are formed instead of such groove parts. The following description is made about the structure of the optical coupling member according to the fourth embodiment, focusing on the difference from the optical coupling member 10 according to the first embodiment.

FIG. 7 provides diagrams each for explaining an optical coupling member 32 according to the fourth embodiment. FIG. 7A is a perspective view of the optical coupling member 32 according to the fourth embodiment, FIG. 7B is a top view of the optical coupling member 32, FIG. 7C is a front view of the optical coupling member 32, and FIG. 7D is a side view of the optical coupling member 32. In the fourth embodiment, common structural parts with the optical coupling member 10 according to the first embodiment are denoted by like reference numerals and their explanation is omitted here.

A joining member 32a is formed by molding with an elastic material such as elastomer and is provided to cover the holders 11 around evenly. The joining member 32a has an approximately rectangular solid shape and is arranged at the position to connect the centers of the holders 11. The length of a side of the joining member 32a along the longitudinal direction of each holder 11 is approximately half of the length of the holder 11. The thickness of the joining member 32a is formed to be larger than the diameter of the holder 11 (see FIG. 7C).

In the joining member 32a, through holes 32b are formed each between every adjacent holders 11, and each through hole 32b has a rectangular shape and its long side is provided in parallel with the holders 11. According to the optical coupling member 32 of the fourth embodiment, as the joining member 32a has the rectangular through holes 32b, it is possible to improve the flexibility of the joining member 32a between the holders 11, thereby improving the flexibility of the optical joining member 32 as a whole and also improving the efficiency of the assembly work.

(Fifth Embodiment)

The optical coupling member 32 according to the fourth embodiment has been described such as the rectangular through holes 32b are formed at parts of the joining member 32a. An optical coupling member according to the fifth embodiment is different from the optical coupling member 32 according to the fourth embodiment in that a plurality of through holes are arranged instead of the rectangular through holes. The following description is made about the structure of the optical coupling member according to the fifth embodiment, focusing on the difference from the optical coupling member 32 according to the fourth embodiment.

FIG. 8 provides diagrams each for explaining an optical coupling member 33 according to the fifth embodiment. FIG. 8A is a perspective view of the optical coupling member 33 according to the fifth embodiment, FIG. 8B is a top view of the optical coupling member 33, FIG. 8C is a front view of the optical coupling member 33 and FIG. 8D is a side view of the optical coupling member 33. In the fifth embodiment, common structural parts with the optical coupling member 10 according to the first embodiment are denoted by like reference numerals and their explanation is omitted here.

A joining member 33a is formed by molding with an elastic material such as elastomer and is provided to cover the holders 11 around evenly. The joining member 33a has an approximately rectangular solid shape and is arranged at the position to connect the centers of the holders 11. The length of a side of the joining member 33a along the longitudinal direction of each holder 11 is approximately half of the length of the holder 11. The thickness of the joining member 33a is formed to be larger than the diameter of the holder 11 (see FIG. 8C).

In the joining member 33a, a plurality of through holes 33b are formed between every adjacent holders 11 in parallel with the holders 11. According to the optical coupling member 33 of the fifth embodiment, as the joining member 33a has the through holes 33b, it is possible to improve the flexibility of the joining member 33a between the holders 11, thereby improving the flexibility of the optical coupling member 32 as a whole and also improving the efficiency of the assembly work.

(Sixth Embodiment)

The optical coupling member 30 according to the second embodiment has been described such that the joining member 30a covers the holders 11 around evenly. An optical coupling member according to the sixth embodiment is different from the optical coupling member 30 according to the second embodiment in that a joining member covers parts of the holders 11 along the radial direction. The following description is made about the structure of the optical coupling member according to the sixth embodiment, focusing on the different from the optical coupling member 30 according to the second embodiment.

FIG. 9 provides diagrams each for explaining an optical coupling member 34 according to the sixth embodiment. FIG. 9A is a perspective view of the optical coupling member 34 according to the sixth embodiment, FIG. 9B is a bottom view of the optical coupling member 34, FIG. 9C is a front view of the optical coupling member 34 arranged in the optical connector 1, and FIG. 9D is a side view of the optical coupling member 34. In the sixth embodiment, common structural parts with the optical coupling member 10 according to the first embodiment are denoted by like reference numerals and their explanation is omitted here.

A joining member 34a is formed by molding with an elastic material such as elastomer. The joining member 34a has an approximately rectangular solid shape and is arranged at the positions to connect the centers of the holders 11. The length of a side of the joining member 34a along the longitudinal direction of each holder 11 is approximately half of the length of the holder 11. The thickness of the joining member 34a is formed to be slightly larger than the radius of the holder 11 (see FIG. 9D). With this structure, a radial part of each of the holders (a part of the holder 11 in the radial direction) is covered by the joining member 34a and the other part juts from the joining member 34a. The joining member 34a covers the holders 11 by half in the radial direction (see FIG. 9C).

Figure 9A:
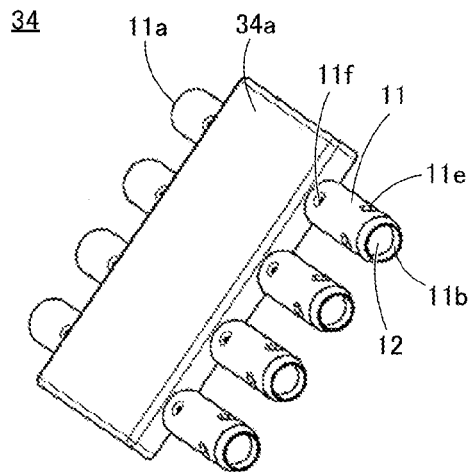
FIGS. 9A-D are diagrams each for explaining an optical coupling member according to a sixth embodiment.
Figure 9C:
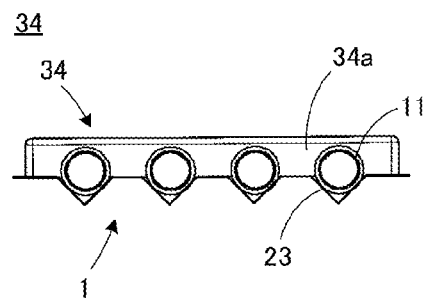
Figure 9B:
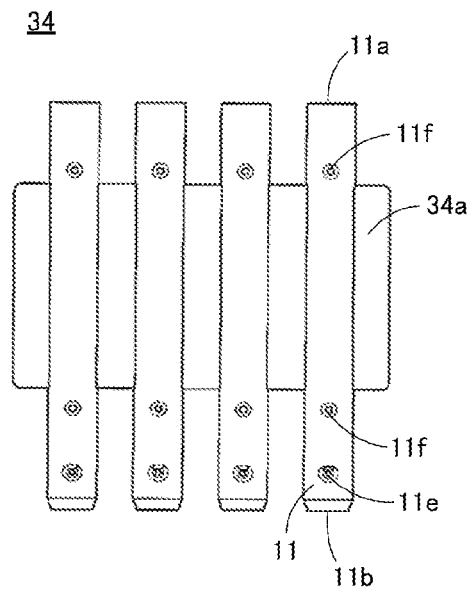
Figure 9D:
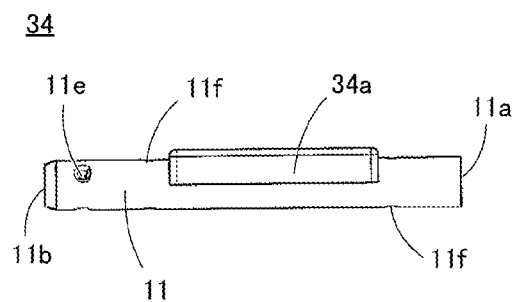

Thus, according to the optical coupling member 34 of the sixth embodiment, as each of the holders 11 has a part not covered by the joining member 34a and jutting therefrom, it is possible to arrange all the holders 11 in the positioning grooves 23 without forming the recess part 25 in the optical connector 1 (see FIG. 9C). Therefore, it is possible to simplify the structure of the optical connector 1 and to reduce its manufacturing cost.

(Seventh Embodiment)

The optical coupling member 34 according to the sixth embodiment has been described such that the joining member 34a covers the holders 11 by half in the radial direction. An optical coupling member according to the seventh embodiment is different from the optical coupling member 34 according to the sixth embodiment in the covering range where the joining member covers the holders 11 in the radial direction. The following description is made about the structure of the optical coupling member according to the seventh embodiment, focusing on the difference from the optical coupling member 34 according to the sixth embodiment.

FIG. 10 provides diagrams each for explaining an optical coupling member 35 according to the seventh embodiment. FIG. 10A is a perspective view of the optical coupling member 35 according to the seventh embodiment, FIG. 10B is a bottom view of the optical coupling member 35, FIG. 10C is a front view of the optical coupling member 35 arranged in the optical connector 1, and FIG. 10D is a side view of the optical coupling member 35. In the seventh embodiment, common structural parts with the optical coupling member 10 according to the first embodiment are denoted by like reference numerals and their explanation is omitted here.

A joining member 35a is formed by molding with an elastic material such as elastomer. The joining member 35a has an approximately rectangular solid shape and is arranged at the position to connect the centers of the holders 11. The length of a side of the joining member 35a along the longitudinal direction of each holder 11 is approximately half of the length of the holder 11. The thickness of the joining member 35a is larger than the radius of the holder 11 and smaller than the diameter of the holder 11 (see FIG. 10D). With this structure, a radial part of each holder 11 is covered by the joining member 35a and the other part juts from the joining member 35a. The joining member 35a covers each holder 11 by three fourths in the radial direction (see FIG. 10C).

Figure 10A:
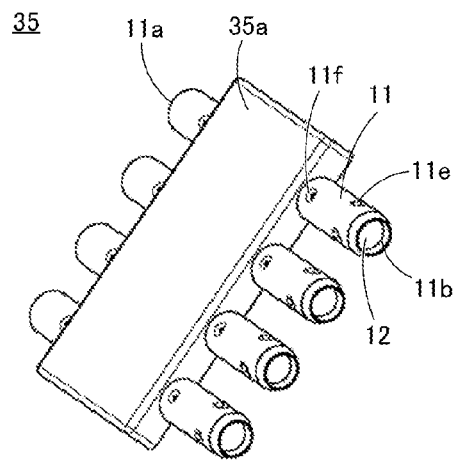
FIGS. 10A-D are diagrams each for explaining an optical coupling member according to a seventh embodiment.
Figure 10C:
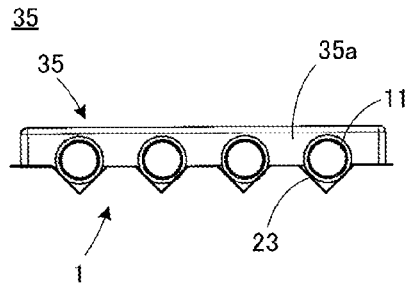
Figure 10B:
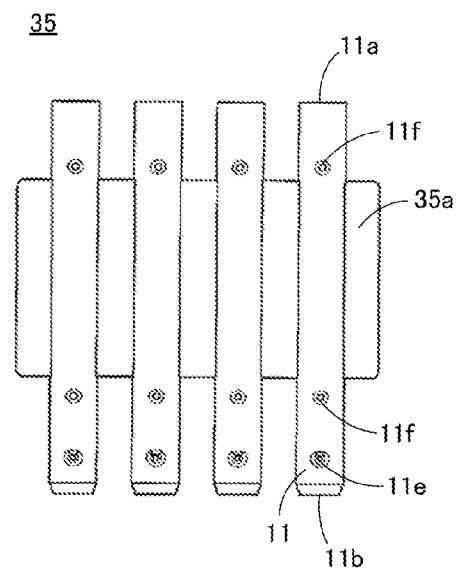
Figure 10D:
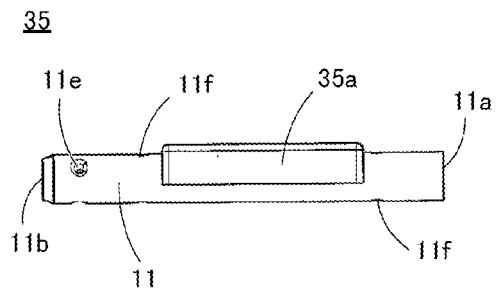

Thus, according to the optical coupling member 35 of the seventh embodiment, as the holders 11 have parts not covered by the joining member 35a but exposed, it is possible to arrange the holders 11 as a whole on the positioning grooves 23 without forming the recess part 25 in the optical connector 1 (see FIG. 10C). Therefore, the structure of the optical connector 1 is simplified, thereby making it possible to reduce the manufacturing cost.

Further, in the optical coupling member 35, as the joining member 35a covers the holders 11 by three fourths in the radial direction, it is possible to hold the holders 11 more stably as compared with the optical coupling member 34 according to the sixth embodiment.

(Eighth Embodiment)

The optical coupling member 31 according to the third embodiment has been described such that the joining member 31a having the opening 31b covers the holders 11 around evenly. An optical coupling member according to the eighth embodiment is different from the optical coupling member 31 according to the third embodiment in that a joining member having an opening covers a part of each holder 11 in the radial direction. The following description is made about the structure of the optical coupling member according to the eighth embodiment, focusing on the difference from the optical coupling member 31 according to the third embodiment.

FIG. 11 provides diagrams each for explaining an optical coupling member 36 according to the eighth embodiment. FIG. 11A is a perspective view of the optical coupling member 36 according to the eighth embodiment, FIG. 11B is a bottom view of the optical coupling member 36, FIG. 11C is a front view of the optical coupling member 36 arranged in the optical connector 1, and FIG. 11D is a side view of the optical coupling member 36. In the eighth embodiment, common structural parts with the optical coupling member 10 according to the first embodiment are denoted by like reference numerals and their explanation is omitted here.

The joining member 36a is formed by molding with an elastic material such as elastomer. In the joining member 36a, an opening 36a is formed which makes a part of each holder 11 exposed when seen from the above. The joining member 36a is arranged at the position to connect the centers of the holders 11. The length of a side of the joining member 36a along the longitudinal direction of each holder 11 is approximately half of the length of the holder 11. The thickness of the joining member 36a is formed to be slightly larger than the radius of the holder 11 (see FIG. 11D). With this structure, a radial part of each holder 11 is covered by the joining member 36a and the other part juts from the joining member 36a. The joining member 36a covers each holder 11 by half in the radial direction (see FIG. 11C).

Figure 11A:
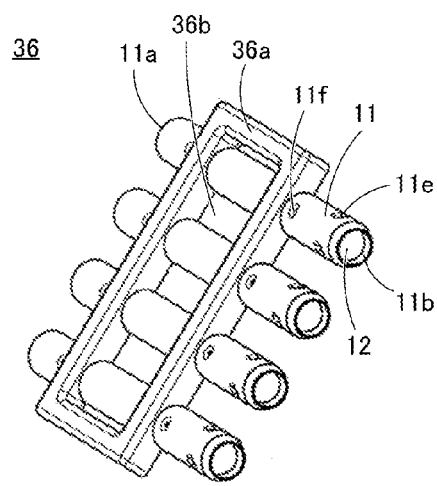
FIGS. 11A-D are diagrams each for explaining an optical coupling member according to an eighth embodiment.
Figure 11C:
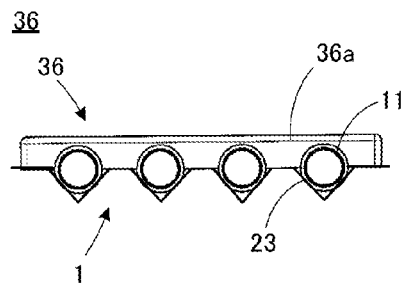
Figure 11B:
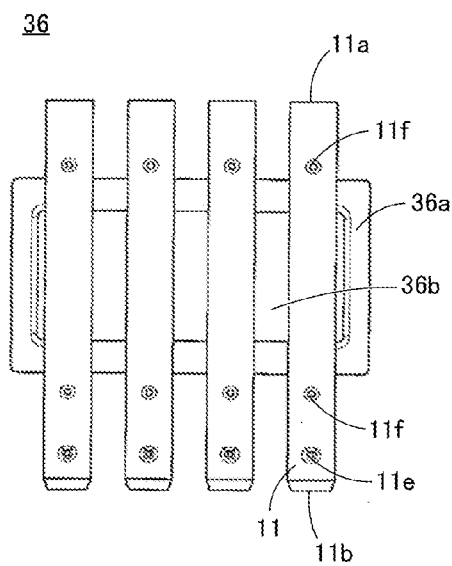
Figure 11D:
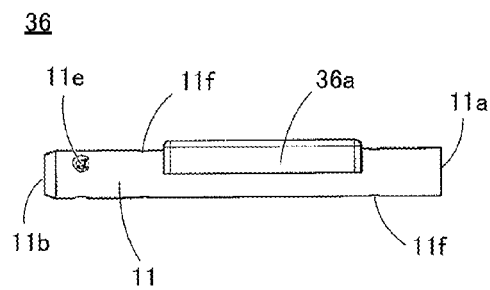
Figure 12A:
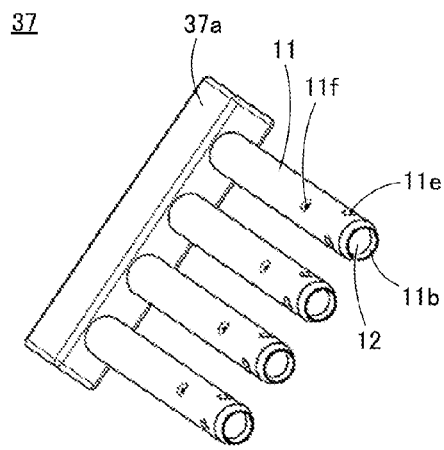
FIGS. 12A-D are diagrams each for explaining an optical coupling member according to a ninth embodiment.
Figure 12C:
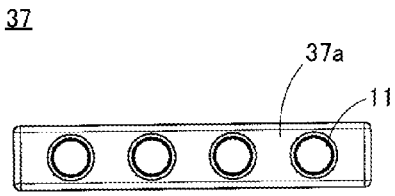
Figure 12B:
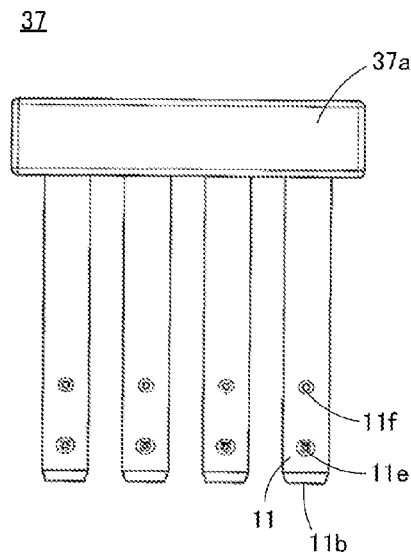
Figure 12D:
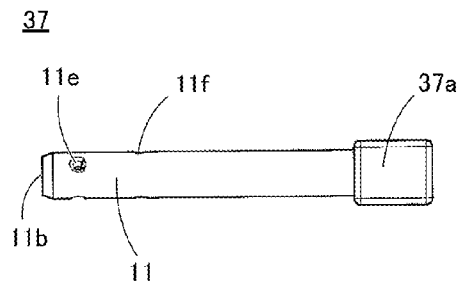
Figure 13A:
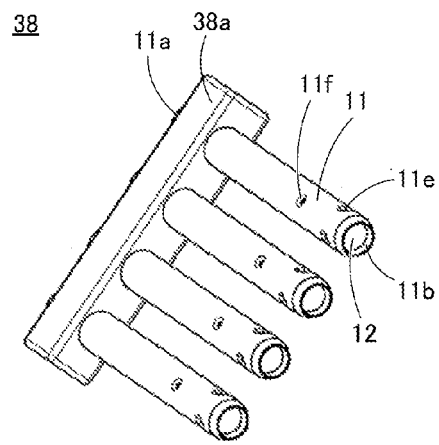
FIGS. 13A-D are diagrams each for explaining an optical coupling member according to a tenth embodiment.
Figure 13C:
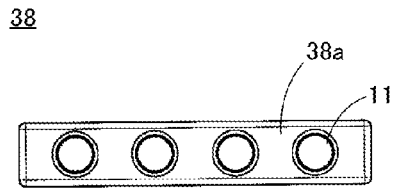
Figure 13B:
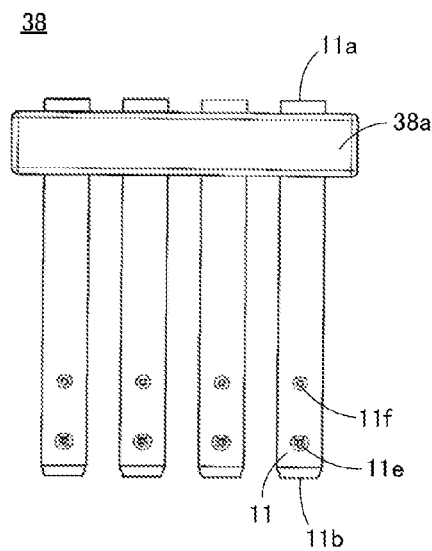
Figure 13D:
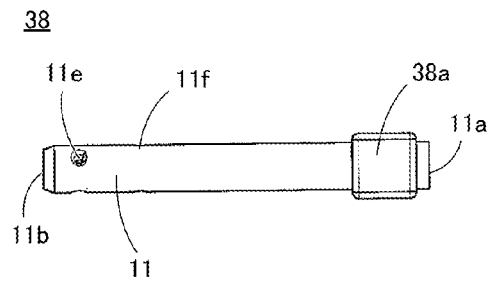

Thus, according to the optical coupling member 36 of the eighth embodiment, as the holders 11 have parts not covered by the joining member 36a and exposed, it is possible to arrange all the holders 11 on the positioning grooves 23 without forming the recess part 25 in the optical connector 1 (see FIG. 11C). Therefore, the structure of the optical connector 1 is simplified, thereby making it possible to reduce the manufacturing cost.

Besides, according to the optical coupling member 36 of the eighth embodiment, as the joining member 36a has the opening 36b which makes a part of each holder 11 exposed, the flexibility of the joining member 36a is improved at the position where the opening 36b is formed, thereby making it possible to improve the flexibility of the optical coupling member 36 as a whole and also improve the efficiency of the assembly work.

(Ninth Embodiment)

The optical coupling member 10 according to the first embodiment has been described such that the joining member 13 is arranged at the position to connect the centers of the holders 11. An optical coupling member according to the ninth embodiment is different from the optical coupling member 10 according to the first embodiment in that a joining member connects parts of the holders 11 near respective insertion holes 11a. The following description is made about the structure of the optical coupling member according to the ninth embodiment, focusing on the difference from the optical coupling member 10 according to the first embodiment.

FIG. 12 provides diagrams each for explaining an optical coupling member 37 according to the ninth embodiment. FIG. 12A is a perspective view of the optical coupling member 37 according to the ninth embodiment, FIG. 12B is a top view of the optical coupling member 37, FIG. 12C is a front view of the optical coupling member 37 and FIG. 12D is a side view of the optical coupling member 37. In the ninth embodiment, common structural parts with the optical coupling member 10 according to the first embodiment are denoted by like reference numerals and their explanation is omitted here.

A joining member 37a is formed by molding with an elastic material such as elastomer and covers the holders 11 around evenly. The joining member 37a is arranged at the position to connect parts of the holders 11 near the respective insertion holes 11a and covers end parts of the holders 11 where the insertion holes 11a are formed. The joining member 37a has an approximately rectangular solid shape and the length of a side of the joining member 37a along the longitudinal direction of each holder 11 is approximately one fifth of the length of the holder 11. The thickness of the joining member 37a is larger than the diameter of the holder 11 (see FIG. 12C).

Thus, according to the optical coupling member 37 according to the ninth embodiment, as the joining member 37a is provided at the position to connect the parts of the holders 11 near the respective insertion holes 11a, it is possible to arrange all the holders 11 on the positioning grooves 23 without forming the recess part 15 to cut across the positioning grooves 23 in the optical connector 1. Therefore, the structure of the optical connector 1 is simplified, thereby making it possible to reduce the manufacturing cost.

Further, according to the optical coupling member 37 of the ninth embodiment, as the structure of the joining member 37a is simplified, thereby making it possible to reduce the manufacturing cost of the joining member 37a and consequently to reduce the manufacturing cost of the optical coupling member 37.

(Tenth Embodiment)

The optical coupling member 37 according to the ninth embodiment has been described such that the joining member 37a is arranged covering the insertion holes 11a of the holders 11. An optical coupling member according to the tenth embodiment is different from the optical coupling member 37 according to the ninth embodiment in that a joining member does not cover the insertion holes 11a of the holders 11. The following description is made about the structure of the optical coupling member according to the tenth embodiment, focusing on the difference from the optical coupling member 37 according to the ninth embodiment.

FIG. 13 provides diagrams each for explaining an optical coupling member 38 according to the tenth embodiment. FIG. 13A is a perspective view of the optical coupling member 38 according to the tenth embodiment, FIG. 13B is a top view of the optical coupling member 38, FIG. 13C is a front view of the optical coupling member 38 and FIG. 13D is a side view of the optical coupling member 38. In the tenth embodiment, common structural parts with the optical coupling member 10 according to the first embodiment are denoted by like reference numerals and their explanation is omitted here.

The joining member 38a is formed by molding with an elastic material such as elastomer and covers the holders 11 around evenly. The joining member 38a is arranged at the position to connect parts of the holders 11 near the respective insertion holes 11a in such a manner as to make the insertion holes 11a exposed. The joining member 38a has an approximately rectangular solid shape and the length of a side of the joining member 38a along the longitudinal direction of each holder 11 is shorter than that of the joining member 37a of the optical coupling member 37 according to the ninth embodiment. The thickness of the joining member 38a is larger than the diameter of the holder (see FIG. 13C).

Thus, according to the optical coupling member 38 of the tenth embodiment, as the joining member 38a is provided near end parts of the holders 11, it is possible to arrange all the holders 11 on the positioning grooves 23 without forming the recess part 25 to cut across the positioning grooves 23 in the optical connector 1. Consequently, the structure of the optical connector 1 is simplified, thereby making it possible to reduce the manufacturing cost.

Further, according to the optical coupling member 38 of the tenth embodiment, as the structure of the joining member 38a is simplified, it is possible to reduce the manufacturing cost of the joining member 38a and consequently reduce the manufacturing cost of the optical coupling member 38.

Furthermore, according to the optical coupling member 38 of the tenth embodiment, as the insertion holes 11a of the holders 11 are exposed as compared with the optical coupling member 37 according to the ninth embodiment, it is possible to facilitate insertion of the optical fibers 21.

(Eleventh Embodiment)

The optical coupling member 10 according to the first embodiment has been described such that the holders 11 are placed on the positioning grooves 23 of the optical connector 1 thereby to assemble the optical connector 1. An optical coupling member according to the eleventh embodiment is different from the optical coupling member according to the first embodiment in that an optical connector is assembled by inserting holders into insertion holes of the optical connector. The following description is made about the structure of the optical coupling member according to the eleventh embodiment and the structure of the optical connector to which the optical coupling member is connected, focusing on the differences from the optical coupling member 10 according to the first embodiment and the optical connector 1 to which the optical coupling member 10 is connected.

Figure 14A:
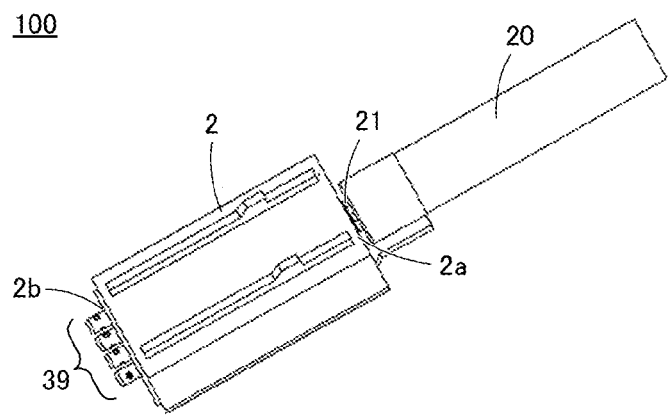
FIGS. 14A-C are diagrams each for explaining an example of an optical connector to which an optical coupling member according to an eleventh embodiment is connected.
Figure 14B:
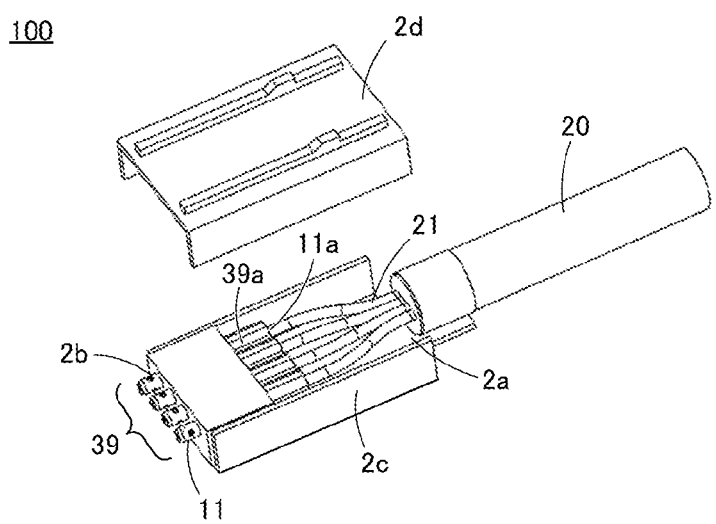
Figure 14C:
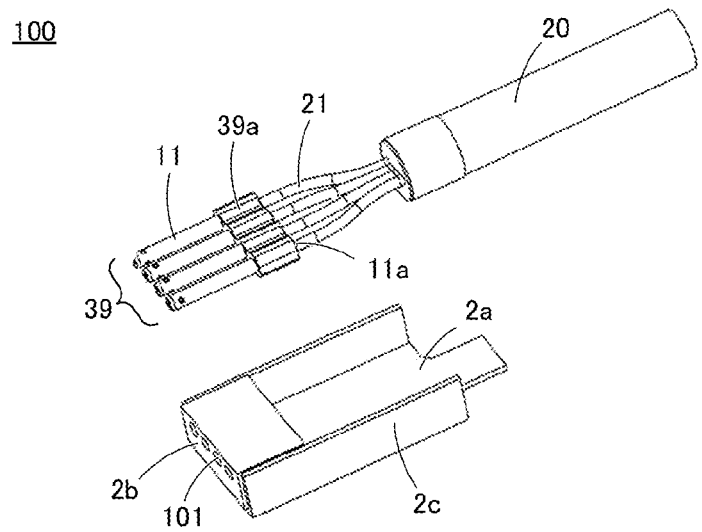

FIGS. 14 and 15 are diagrams each for explaining an example of an optical connector to which an optical coupling member according to the eleventh embodiment is connected. FIG. 14A is a perspective view illustrating an example of the optical connector to which the optical coupling member according to the eleventh embodiment is connected, FIG. 14B is a perspective view illustrating the optical connector illustrated in FIG. 14A from which a cover member of a housing is removed, FIG. 14C is a perspective view illustrating the optical connector illustrated in FIG. 14B from which the optical coupling member is removed, FIG. 15A is a top view illustrating an example of the optical connector to which the optical coupling member according to the eleventh embodiment is connected, FIG. 15B is a cross sectional view taken along the arrow A-A in FIG. 15A, and FIG. 15C is a cross sectional view taken along the arrow C-C in FIG. 15A. In the eleventh embodiment, common structural parts with the optical coupling member according to the first embodiment and the optical connector 1 to which the optical coupling member 10 is connected are denoted by like reference numerals and their explanation is omitted here.

As illustrated in FIG. 14A, the optical connector 100 has an approximately rectangular solid shaped housing 2. At an end part 2a of the housing 2, a plurality of optical fibers 21 are inserted which are jutting from a multi-core optical fiber cable 20. At the opposite end part 2b of the housing 2, parts of the optical coupling member 39 mounted on the optical fibers 21 are jutting therefrom.

As illustrated in FIG. 14B, in the optical connector 100, the optical fibers 21 and the optical coupling member 39 are arranged on the base 2c from which a cover member 2d of the housing 2 is removed. In the present embodiment, four optical fibers 21 are jutting from the multi-core optical fiber cable 20. The optical coupling member 39 is configured to have holders 11 that are equal in number to the optical fibers 21 (four in this embodiment) and the joining member 39a for connecting the holders 11 in parallel to each other. The optical coupling member 39 is fixed to the optical fibers 21 by inserting the optical fibers 21 into the holders 11.

As illustrated in FIG. 14C, the joining member 39a in the optical coupling member 39 is arranged at the position to connect the parts of the holders 11 near their respective insertion holes 11a and covers the end parts of the holders 11 where the insertion holes 11a are formed. The joining member 39a is formed by molding with an elastic material such as elastomer and covers the holders 11 around evenly. The joining member 39a may be configured to have a groove part with a V shaped cross section formed between every adjacent holders 11 and in parallel to the holders 11.

In the optical connector 100, insertion holes 101 are formed on the base 2c of the housing 2, near the opposite end part 2b, for positioning and fixing the optical coupling member 39. In the insertion holes 101, the holders 11 of the optical coupling member 39 are inserted thereinto from one end part 2a side. The optical coupling member 39 inserted into the insertion holes 101 is positioned once a part of the joining member 39a reaches the insertion holes 101.

In the present embodiment, the number of insertion holes 101 is four in accordance with the number of the holders 11 or optical fibers 21, and the insertion holes 101 are provided in parallel and equally spaced. Each of the insertion holes 101 is configured to have a diameter approximately equal to the diameter of the holder 11.

As illustrated in FIG. 15A, in the optical connector 100, parts of the optical coupling member 39 jutting from the opposite end part 2b are aligned at even intervals and the lengths of the jutting parts are equal to each other.

As illustrated in FIG. 15B, the holders 11 of the optical coupling member 39 are inserted into the insertion holes 101 in the optical connector 100 and aligned.

As illustrated in FIG. 15C, the optical coupling member 39 is configured such that when the optical coupling member 39 is positioned by bringing a part of the joining member 39a into contact with the insertion holes 101 in the optical connector 100, the tip end parts of the optical coupling member 39 jut from the opposite end part 2b of the housing 2 by a predetermined length.

As described above, as the plural holders 11 capable of supporting the optical fibers 21 are connected in parallel to each other by the joining member 39a in the optical coupling member 39, it is possible to position the optical fibers 21 with high accuracy without need to insert the optical fibers 21 into the insertion holes 101 in the optical connector 100 one by one and align them. Therefore, it is possible to improve the efficiency of the assembly work of the optical connector 100 and also possible to assemble the optical connector 100 by positioning the optical fibers 21 in the optical connector 100 with high accuracy.

Here, the present invention is not limited to the above-described embodiments, but may be embodied in various forms. In the above-described embodiments, the size and shape are not limited to the sizes and shapes illustrated in the attached drawings and may be modified appropriately as far as they fall within the scope where the effect of the present invention is produced. Other modifications may be also made appropriately without departing from the scope of the purpose of the present invention.

In the above-described embodiments, each holder 11 has an approximately cylindrical shape, however the shape of the holder 11 is not limited to this and may be modified appropriately. The holder 11 may take any shape as far as a housing part 11c for housing a lens 12 is formed at an end part and an insertion hole 11a for inserting an optical fiber 21 is formed at the opposite end part. For example, the holder may take a square-tube shape (that is, tube body of which a cross section orthogonal to the insertion direction of the optical fiber 21 is a square shape).

Further, in the above-described embodiments, each positioning groove 23 of the optical connector 1 has been described as having a V-shaped cross section. However, the shape of the positioning groove 23 is not limited to this and may be modified appropriately. The positioning groove 23 may take any shape in accordance with the shape of the holder 11. For example, the cross section of the positioning groove 23 may have a circular arc shape or a square shape.

In the above-described embodiments, the lens 12 and the optical fibers 21 have been described as being positioned while a part of each lens 12 and a part of each optical fiber 21 are in contact with the circumferential wall surfaces formed by the positioning recess 11e formed in each holder 11. However, the method for positioning the lens 12 and the optical fibers 21 is not limited to this and may be modified appropriately. For example, each lens 12 and each optical fiber 21 may be positioned by bringing only one of the lens 12 and the optical fiber 21 into contact with the circumferential surface formed by the positioning recess 11e and the other may be positioned by a part other than the positioning recess 11e in the holders 11. Note that in this case, the part for positioning the other needs to be designed to have a fixed positional relationship with the positioning recess 11e. That is, as for the holders 11, the present invention includes such an idea that each lens 12 and each optical fiber 21 are positioned by brining one of the lens 12 and the optical fiber 21 into contact with the positioning recess 11e.

The disclosure of Japanese Patent Application No. 2012-210995, filed on Sep. 25, 2012, including the specification, drawings, and abstract, is incorporated herein by reference in its entirety.

The invention claimed is:

1. An optical coupling member comprising:
a plurality of holding members that respectively hold optical fibers that are inserted into insertion holes formed at end parts of the respective holding members;
lenses housed in housing parts formed at opposite end parts of the respective holding members; and
a joining member for connecting the plurality of holding members as aligned, the joining member being formed of an elastic material.

2. The optical coupling member according to claim 1, wherein the joining member covers the holding members around evenly.

3. The optical coupling member according to claim 1, wherein the joining member covers a part of each of the holding members in a radial direction.

4. An optical coupling member comprising:
holding members for being able to hold optical fibers that are inserted from insertion holes formed at end parts of the holding members;
lenses housed in housing parts formed at opposite end parts of the holding members; and
a joining member for connecting the holding members as aligned, the joining member being formed of an elastic material,
wherein the joining member has a groove part formed between every adjacent two of the holding members.

5. An optical coupling member comprising:
a plurality of holding members that respectively hold optical fibers that are inserted into insertion holes formed at end parts of the respective holding members;
lenses housed in housing parts formed at opposite end parts of the respective holding members; and
a joining member for connecting the plurality of holding members as aligned, the joining member being formed of an elastic material,
wherein the joining member has a through hole formed between every adjacent two of the holding members.

6. The optical coupling member according to claim 5, wherein the through hole comprises a plurality of through holes arranged in parallel to the holding members.

7. An optical coupling member comprising:
a plurality of holding members that respectively hold optical fibers that are inserted into insertion holes formed at end parts of the respective holding members;
lenses housed in housing parts formed at opposite end parts of the respective holding members; and
a joining member for connecting the plurality of holding members as aligned, the joining member being formed of an elastic material,
wherein the joining member has an opening which makes parts of the holding members exposed when seen from above.

8. The optical coupling member according to claim 1, wherein the optical fibers and the lenses are each positioned by being in contact with a circumferential wall surface formed by a recess that is provided in a part of an outer circumferential surface of each of the holding members.

9. An optical connector for connecting the optical coupling member according to claim 1.

* * * * *